US012718042B2

(12) United States Patent
Kogame

(10) Patent No.: US 12,718,042 B2
(45) Date of Patent: Aug. 25, 2026

(54) PRINTING APPARATUS, PRINTING METHOD, AND NON-TRANSITORY AND COMPUTER-READABLE MEDIUM STORING COMPUTER PROGRAM

(71) Applicant: BROTHER KOGYO KABUSHIKI KAISHA, Nagoya (JP)

(72) Inventor: Yuji Kogame, Nagoya (JP)

(73) Assignee: BROTHER KOGYO KABUSHIKI KAISHA, Nagoya (JP)

( * ) Notice: Subject to any disclaimer, the term of this patent is extended or adjusted under 35 U.S.C. 154(b) by 274 days.

(21) Appl. No.: 18/660,706

(22) Filed: May 10, 2024

(65) Prior Publication Data

US 2024/0412022 A1 Dec. 12, 2024

(30) Foreign Application Priority Data

Jun. 6, 2023 (JP) ................................ 2023-093464

(51) Int. Cl.
*G06K 15/02* (2006.01)
*B41J 2/21* (2006.01)

(52) U.S. Cl.
CPC ........ *G06K 15/1898* (2013.01); *B41J 2/2103* (2013.01); *B41J 2/2139* (2013.01); *B41J 2/2142* (2013.01); *G06K 15/186* (2013.01); *G06K 15/1896* (2013.01); *G06K 2215/101* (2013.01)

(58) Field of Classification Search
CPC ............ G06K 15/1898; G06K 15/186; G06K 15/1896; G06K 2215/101; B41J 2/2103; B41J 2/2139; B41J 2/2142; B41J 2/2146
USPC .......................................................... 358/1.8
See application file for complete search history.

(56) References Cited

U.S. PATENT DOCUMENTS

2006/0227379 A1* 10/2006 Kakutani ............ H04N 1/4105 358/3.01
2010/0073416 A1 3/2010 Yokota
2014/0292873 A1* 10/2014 Suzuki .............. G06K 15/1878 347/15

FOREIGN PATENT DOCUMENTS

JP 2010-076142 A 4/2010
JP 2011-235528 A 11/2011

* cited by examiner

*Primary Examiner* — Allen H Nguyen
(74) *Attorney, Agent, or Firm* — Baker Botts L.L.P.

(57) ABSTRACT

A printing apparatus includes: a main controlling circuit; a sub-controlling circuit group including sub-controlling circuits connected in series; and heads. The print data includes data of a plurality of pixels. The main controlling circuit is configured to execute: generation of, based on the print data, data of first to n-th pixel groups regarding the first to n-th pixel groups each including pixels which are not adjacent (n≥2), and transmission of the data of the first to n-th pixel groups to the sub-controlling circuit group. Each of the plurality of sub-controlling circuits is configured to execute: obtainment of data of pixels which are associated with each of the plurality of sub-controlling circuits, from the data of the first to n-th pixel groups, and driving of one of the plurality of heads corresponding thereto, based on the data of the pixels.

12 Claims, 7 Drawing Sheets

PRINT DATA

DATA OF PIXEL GROUP

FIRST TIME

SECOND TIME

THIRD TIME

FOURTH TIME

FIG. 2

100
4
42(42R)
42(42F)
42(42R)
421
422
42(42F)
42(42R)
42(42F)
42b
42a
42b
42
(42R)
42(42F)
42b
42
(42R)
REAR
RIGHT
FRONT
LEFT

FIG. 3

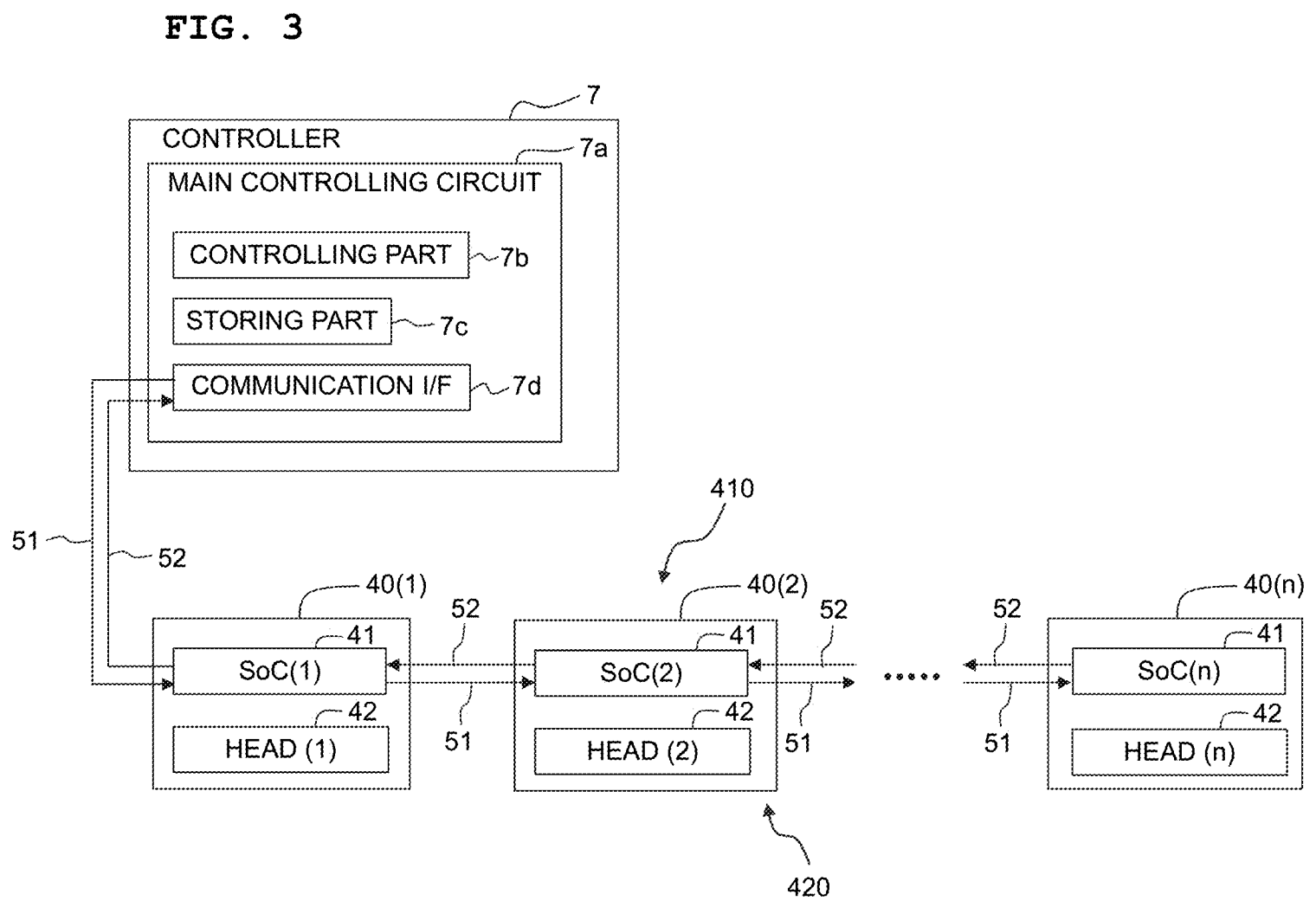

CONTROLLER

MAIN CONTROLLING CIRCUIT

CONTROLLING PART

STORING PART

COMMUNICATION I/F 7
7a
7b
7c
7d

SoC(1)
HEAD (1)
40(1)

SoC(2)
HEAD (2)
40(2)

SoC(n)
HEAD (n)
40(n)

41
42
51
52
410
420

FIRST MASK

SECOND MASK

FIG. 8

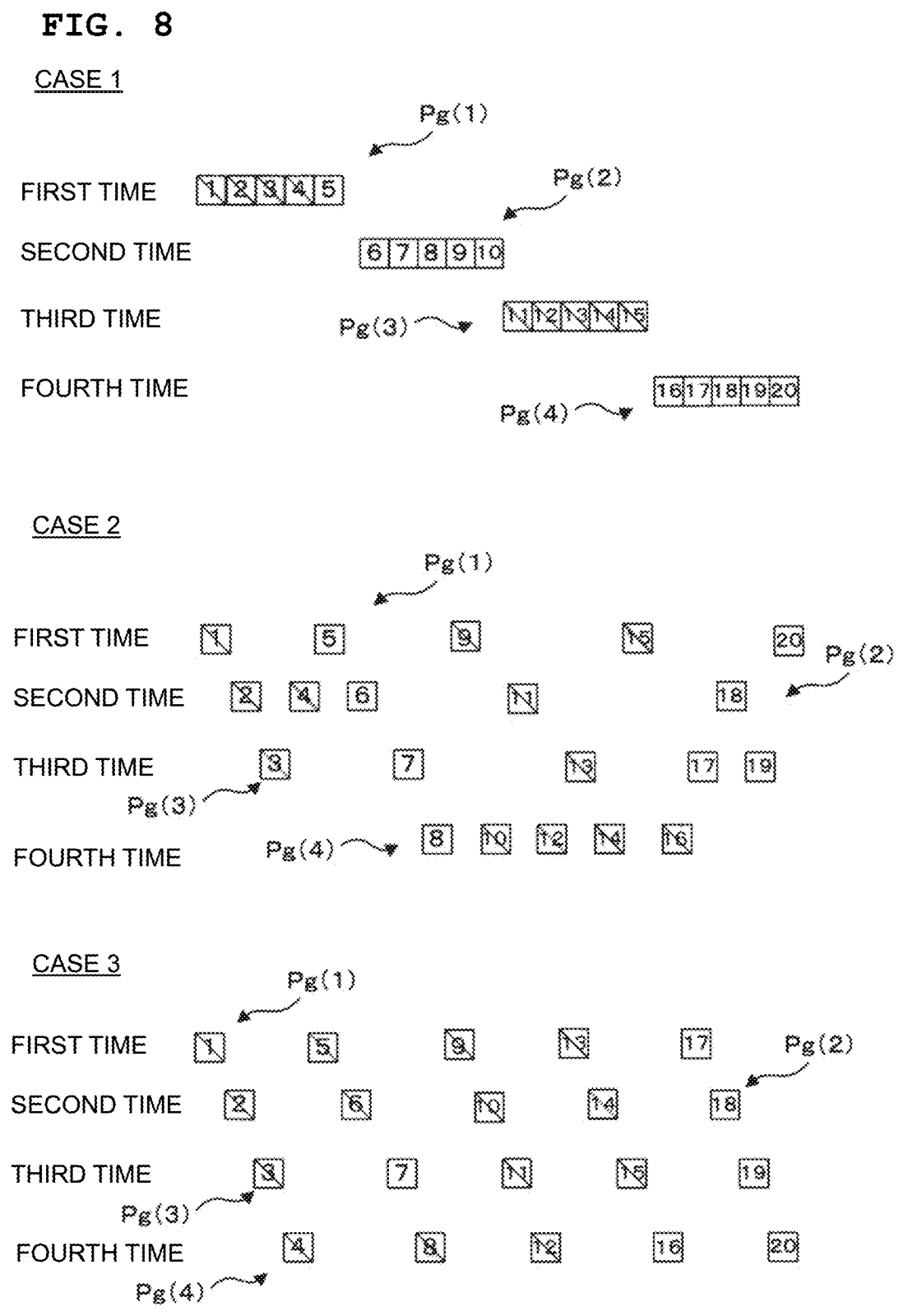

CASE 1

FIRST TIME 1 2 3 4 5 Pg(1)

SECOND TIME 6 7 8 9 10 Pg(2)

THIRD TIME Pg(3) 11 12 13 14 15

FOURTH TIME Pg(4) 16 17 18 19 20

CASE 2

FIRST TIME 1 5 9 15 20 Pg(1)

SECOND TIME 2 4 6 11 18 Pg(2)

THIRD TIME 3 7 13 17 19 Pg(3)

FOURTH TIME Pg(4) 8 10 12 14 16

CASE 3

FIRST TIME 1 5 9 13 17 Pg(1)

SECOND TIME 2 6 10 14 18 Pg(2)

THIRD TIME 3 7 11 15 19 Pg(3)

FOURTH TIME 4 8 12 16 20 Pg(4)

PRINTING APPARATUS, PRINTING METHOD, AND NON-TRANSITORY AND COMPUTER-READABLE MEDIUM STORING COMPUTER PROGRAM

REFERENCE TO RELATED APPLICATIONS

This application claims priority from Japanese Patent Application No. 2023-093464 filed on Jun. 6, 2023. The entire content of the priority application is incorporated herein by reference.

BACKGROUND ART

There is a proposed liquid ejecting apparatus including: a plurality of head substrates configured to drive a head, and a plurality of head controlling substrates configured to control the plurality of head substrates. The plurality of head controlling substrates are daisy-chained. A main controller transmits image data to a head controlling substrate disposed at an end on the upstream side among the plurality of head controlling substrates. Each of the plurality of head controlling substrates transfers the image data to the downstream side thereof and controls one of the plurality of head substrates.

SUMMARY

In a case where an error occurs in the image data during the transmission, the image data may be re-transmitted to the plurality of head controlling substrate. However, in such a case where the re-transmission of the image data is not completed before the heads are driven, the driving of the heads is required to be stopped or the printing speed is required to be lowered, resulting in a degraded printing efficiency.

The present disclosure has been made in view of the above-described situation, and an object of the present disclosure is to provide a technique capable of controlling or reducing the degradation of printing efficiency and the degradation of printing precision, even in a case where an error occurs in the print data during the transmission.

According to an embodiment of the present disclosure, a printing apparatus includes: a main controlling circuit; a sub-controlling circuit group including a plurality of sub-controlling circuits which are connected in series and which are configured to transfer print data transmitted thereto by the main controlling circuit from upstream to downstream of the plurality of sub-controlling circuits; and a plurality of heads. Each of the plurality of heads is configured to be driven by one of the plurality of sub-controlling circuits corresponding thereto; and the print data includes data of a plurality of pixels. The main controlling circuit is configured to execute: generation of, based on the print data, data of a first pixel group to data of an n-th pixel group regarding, respectively, the first pixel group to the n-th pixel group each including pixels, of the plurality of pixels, which are not adjacent (the "n" representing a natural number which is two or more), and transmission of the data of the first pixel group to the data of the n-th pixel group to the sub-controlling circuit group. Each of the plurality of sub-controlling circuits is configured to execute: obtainment of data of pixels, of the plurality of pixels, which are associated with each of the plurality of sub-controlling circuits, from the data of the first pixel group to the data of the n-th pixel group, and driving of one of the plurality of heads corresponding thereto, based on the data of the pixels associated with each of the plurality of sub-controlling circuits.

In the printing apparatus according to the embodiment of the present disclosure, a printing method and a non-transitory and computer-readable medium storing a computer program, the main controlling circuit generates the data of the first pixel group to the data of the n-th pixel group each including pixels, of the plurality of pixels, which are not adjacent, based on the print data. The sub-controlling circuit group transfers the data of the first pixel group and the data of the n-th pixel group. Each of the plurality of sub-controlling circuits obtains the data of the pixels, of the plurality of pixels, which are associated with the self, from the data of the first pixel group to the data of the n-th pixel group and drives one of the plurality of heads corresponding thereto, based on the data of the pixels associated with the self Even in a case where the error has occurred in data of a certain pixel group among the data of the first pixel group to the data of the n-th pixel group, the printing can be performed based on data of another pixel group different from the data of the certain pixel group in which the error has occurred, without re-transmission of the data of the certain pixel group. This contributes to the prevention or reduction of the degradation of the printing efficiency and the degradation of the printing precision.

BRIEF DESCRIPTION OF DRAWINGS

FIG. 2 is a plan perspective view of an ink-jet head.

FIG. 3 is a block diagram of a controller and the ink-jet head.

FIG. 8 is a view explaining cases in which regularity or bias occurs in the arrangement of pixels included in each of pixel groups (Pgs) during the generation of Pg (1) to Pg (4).

DESCRIPTION

Figure 1:
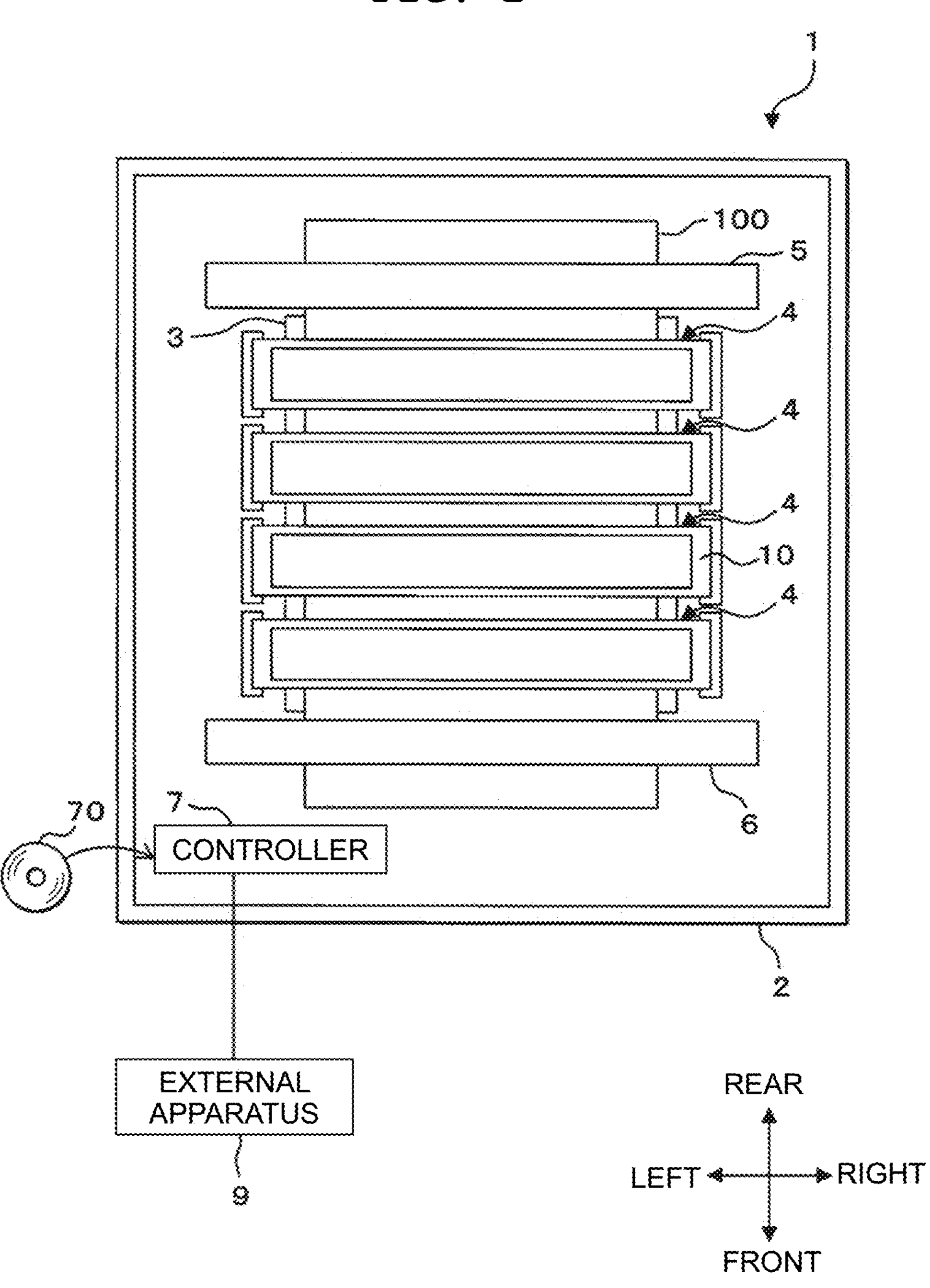
FIG. 1 is a plan view schematically depicting a printing apparatus.
Figure 4:
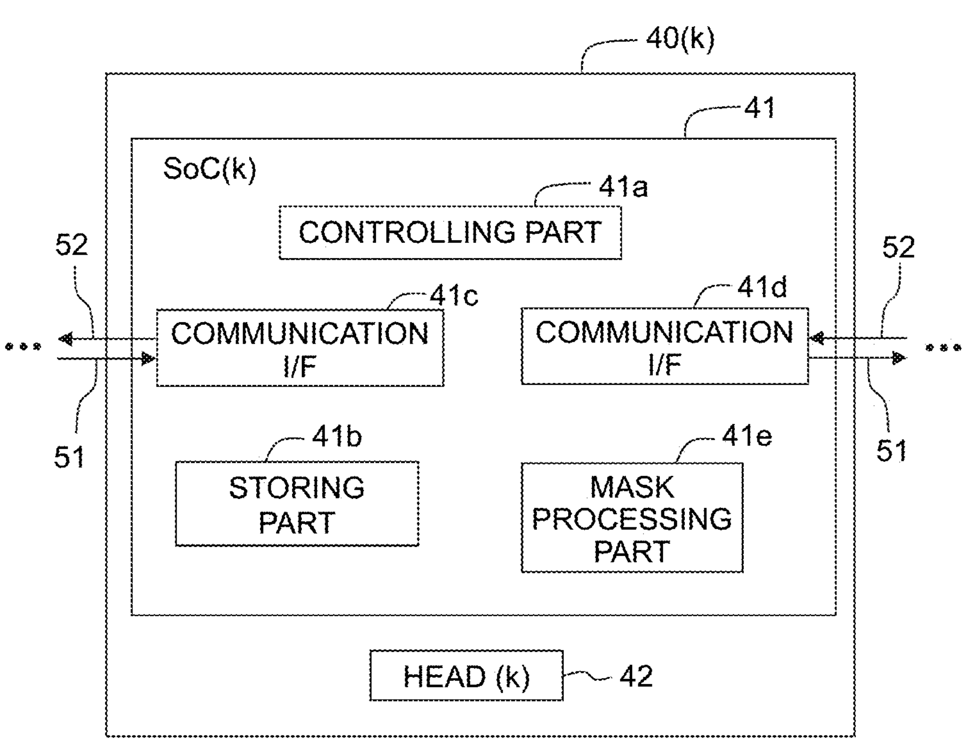
FIG. 4 is a block diagram of a k-th head module.

The present disclosure will be described based on the drawings depicting a printing apparatus according to an embodiment. In FIG. 1, a conveying direction of a print sheet 100 corresponds to the front-rear direction of the printing apparatus 1. The print sheet 100 is an example of a print medium. For example, a film or cloth may be used as the print medium. Further, the width direction of the print sheet 100 corresponds to the left-right direction of the printing apparatus 1. Further, a direction orthogonal to the front-rear direction and the left-right direction, namely, a direction perpendicular to the sheet surface of FIG. 1 corresponds to the up-down direction of the printing apparatus 1.

As depicted in FIG. 1, the printing apparatus 1 includes a platen 3, four ink-jet heads 4, two conveying rollers 5 and 6, and a controller 7 which are accommodated inside a case 2. The print sheet 100 passes on the upper surface of the platen 3. The four ink-jet heads 4 are aligned in the conveying direction above the platen 3. Each of the four ink-jet heads 4 is a head of a so-called line type. An ink from an ink tank (not depicted in the drawings) is supplied to each of the four ink-jet heads 4. Inks of mutually different colors are supplied, respectively, to the four ink-jet heads 4.

As depicted in FIG. 1, the two conveying rollers 5 and 6 are disposed, respectively, on the rear side and the front side of the platen 3. Each of the two conveying rollers 5 and 6 is driven by a non-illustrated motor and conveys the print sheet 100 on the platen 3 frontward. The controller 7 is connected to an external apparatus 9, such as a PC, so that data communication is possible between the controller 7 and the external apparatus 9, and the controller 7 is configured to drive the respective parts of the printing apparatus 1 based on print data transmitted from the external apparatus 9.

Figure 2:
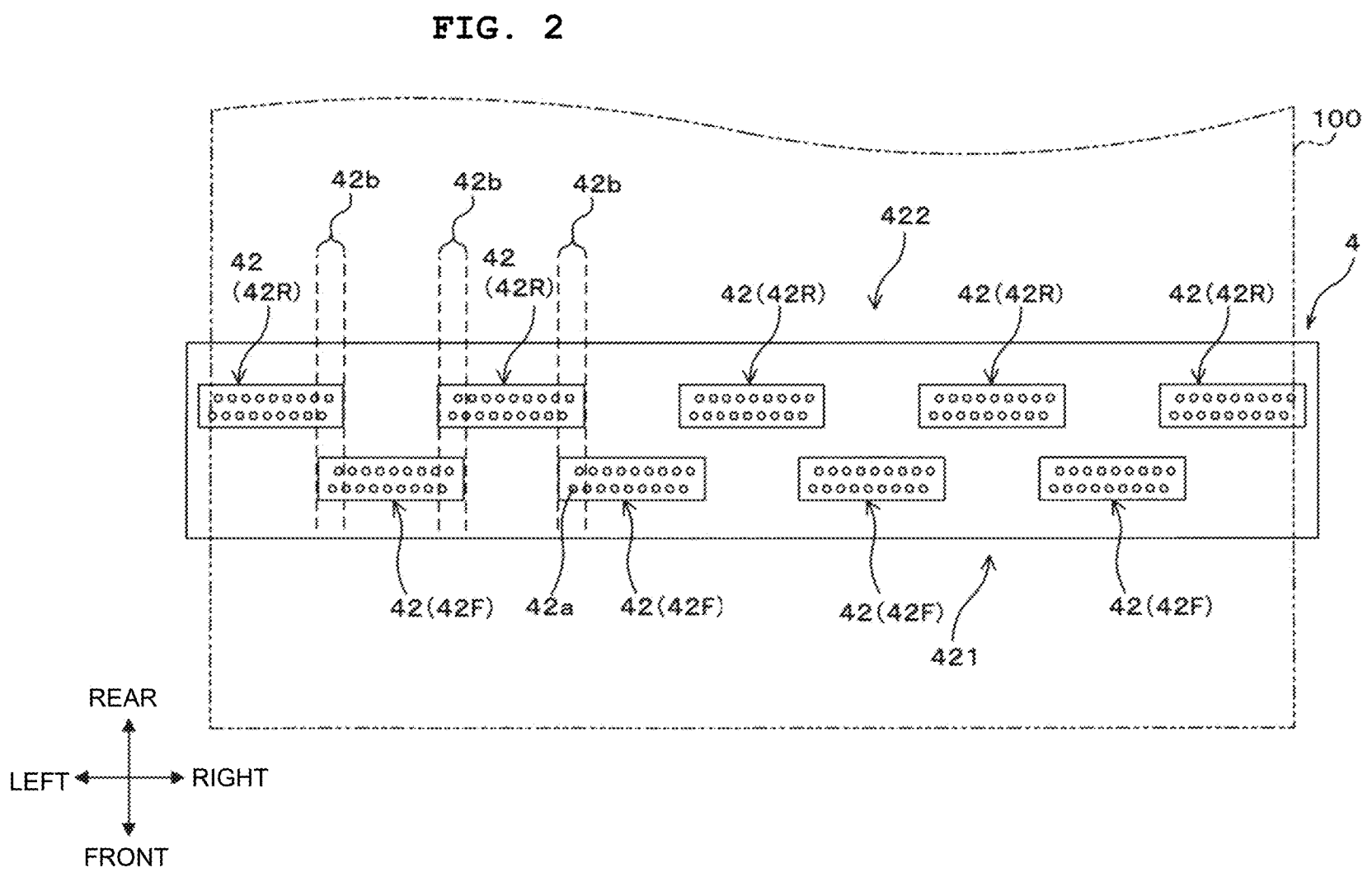

As depicted in FIG. 2, The ink-jet head 4 includes a plurality of heads 42. A plurality of nozzles 42*a* are formed in the lower surface of each of the plurality of heads 42. The plurality of heads 42 includes a first head row 421 having four heads 42 which are aligned in the left-right direction, and a second head row 422 having five heads 42 aligned in the left-right direction. The first head row 421 is disposed on the front side, and the second head row 422 is disposed on the rear side. The four heads 42 in the first head row 421 are hereinafter referred also to as heads 42F, and the five heads 42 of the second head row 422 are hereinafter referred also to as heads 42R.

In the left-right direction, four gaps are defined between the five heads 42R in the left-right direction. In the left-right direction, the position of each of the four heads 42F corresponds to the position of one of the four gaps. Namely, each of the four heads 42F is disposed between two adjacent heads 42R, of the five heads 42R, which are adjacent in the left-right direction. In the front-rear direction, a left end part of each of the four heads 42F overlaps with a right end part of a head 42R, which is on the left side of the two adjacent heads 42R, and a right end part of each of the four heads 42F overlaps with a left end part of a head 42R which is on the right side of the two adjacent heads 42R. An area in which each of the heads 42F and one of the heads 42R overlap constructs an overlap area 42*b*.

In each of the heads 42F, nozzles 42*a* at each of the left and right end parts are disposed in the overlap area 42*b*. In the five heads 42R, nozzles 42*a* at the right end part of the left-most head 42R are disposed in the overlap area 42*b*, and nozzles 42*a* at the left end part of the right-most head 42R are disposed in the overlap area 42*b*. In heads 42R, between the left-most head 42R and the right-most head 42R, nozzles 42*a* at each of the left and right end parts of the head 42R are disposed in the overlap area 42*b*. Note that the ink-jet head 4 includes a driving mechanism (not depicted in the drawings) and is movable to a flushing receiver (not depicted in the drawings) by the driving mechanism.

As depicted in FIG. 3, the controller 7 includes a main controlling circuit 7*a*. The main controlling circuit 7*a* includes a controlling part 7*b*, a storing part 7*c*, and a communication interface (I/F) 7*d*. The controlling part 7*b* includes a logic circuit, such as an FPGA. Note that the controlling part 7*b* may include a processor such as, for example, a CPU or an ASIC. The storing part 7*c* includes a main memory and an auxiliary memory. The main memory is exemplified by RAM. The auxiliary memory is exemplified by a ROM and a rewritable storage medium such as, for example, an EEPROM (a registered trademark of Renesas Electronics Corporation), a flash ROM, a hard disc, etc. A control program is stored in the auxiliary memory. The controlling part 7*b* is configured to read the control program from the auxiliary memory and into the main memory and to execute the control program. The control program may be installed in the auxiliary memory from a storage medium 70 (see FIG. 1), which is exemplified by an optical disc or a portable flash memory. Note that the control program may be downloaded to the auxiliary memory from a server which is connected to the printing apparatus 1 via a communication network. The communication I/F 7*d* is connected to a forward direction-communicating route 51 and a backward direction-communicating route 52. The controller 7 is configured to control the printing apparatus 1 based on the control program.

The ink-jet head 4 includes a plurality of head modules 40. The plurality of head modules 40 are aligned, for example, in the left-right direction; the plurality of head modules 40 is connected in series via the forward direction-communicating route 51 and is connected in series via the backward direction-communicating route 52. The plurality of head modules 40 has, for example, a first head module 40(1), a second head module 40(2), a third head module 40(3) . . . , and an n-th head module 40(*n*). Note that the "n" represents a natural number. Among the plurality of head modules 40, the first head module 40(1) is disposed at the leftmost position, and the n-th head module 40(*n*) is disposed at the rightmost position. The first head module 40(1) is disposed at a position closest to the controller 7 among all the plurality of head modules 40, and the n-th head module 40(*n*) is disposed at a position farthest from the controller 70 among all the plurality of head modules 40.

In the following description, "k" represents a natural number which is "n" or less. The k-th head module 40(*k*) includes an SoC 41 and a head 42. In the following, the SoC 41 of the k-th head module 40(*k*) is also referred to as an SoC (K), and the head 42 of the k-th head module 40(*k*) is also referred to as a head (k). The SoC (k) corresponds to a "sub-controlling circuit." The SoC (k) includes a controlling part 41*a*, a storing part 41*b*, a communication I/F 41*c*, a communication I/F 41*d*, and a mask processing part 41*e*. The controlling part 41*a* includes, for example, a logic circuit or a processor. The storing part 41*b* includes a volatile memory such as an SDRAM and a rewritable and non-volatile storage medium such as an EEPROM, a flash ROM, and a hard disc. Each of the communication I/Fs 41*c* and 41*d* is connected to the forward direction-communicating route 51 and the backward-direction communicating route 52.

The direction of transmitting data in the forward direction-communicating route 51 is a direction from an SoC (1) toward an SoC (n), namely, the forward direction. The forward direction is a direction from the upstream toward the downstream. The direction of transmitting data in the backward direction-communicating route 52 is a direction from the SoC (n) toward the SoC (1), namely, the backward direction. The backward direction is a direction from the downstream toward the upstream.

Note that the left in FIG. 2 corresponds to the upstream, and the right in FIG. 2 corresponds to the downstream. The leftmost head 42 depicted in FIG. 2 is a head disposed at the upstream-most position, and the rightmost head 42 depicted in FIG. 2 is a head disposed at the downstream-most position. A plurality of SoCs, each of which corresponds to one of the respective heads 42 in FIG. 2, are connected in series by the forward direction-communicating route 51 and the backward direction-communicating route 52.

A plurality of SoCs, namely, an SoC (1) to an SoC (n) construct an SoC group 410, and the plurality of heads 42, namely, a head (1) to a head (n) construct a head group 420 (see FIG. 3). The SoC group 410 corresponds to a "sub-controlling circuit group."

Figure 5:
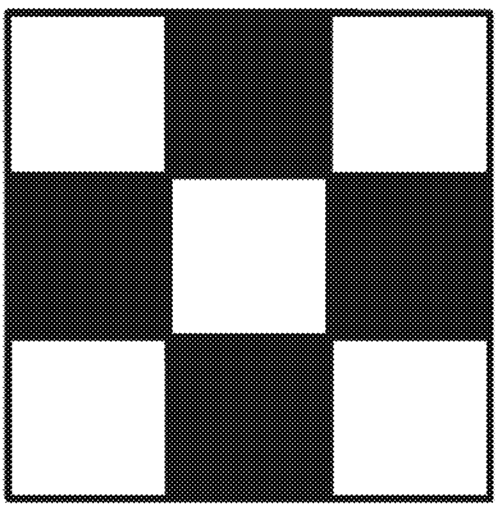
FIG. 5 is a conceptual view depicting an example of a mask in a mask processing part.
Figure 5:
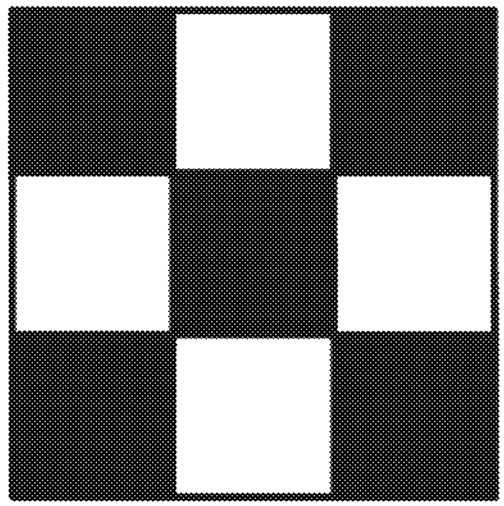

For example, as depicted in FIG. 5, the mask processing part 41*e* includes a first mask and a second mask. The first mask and the second mask are in an exclusive relationship; each of the first and second masks has 3 pixels×3 pixels and is repeatedly applied in the conveying direction. In each of the first and second masks, the bit of a black (solid) pixel represents 1 (one) and means ejection. Further, in each of the first and second masks, the bit of a white (hollow) pixel represents 0 (zero) and means non-ejection. Mask data representing the first mask and the second mask is previously stored, for example, in a memory (not depicted in the drawings) of the mask processing part 41*e*.

Figure 6:
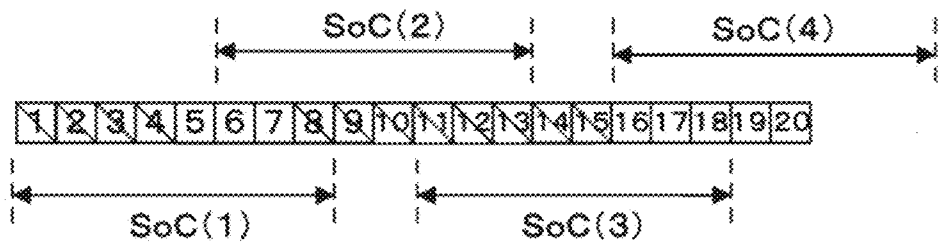
FIG. 6 is a schematic view depicting an example of print data of one line.

In FIG. 6, data of a plurality of pixels is represented, with each of the plurality of pixels as a square. As print data of one line, for example, data of 20 (twenty) pixels is depicted. The data of the plurality of pixels represents pixels of an image formed on the print paper sheet 100. In the following, the data of the twenty pixels are also referred to as data of pixel (1) to data of pixel (20). Numbers 1 to 20 indicated in FIG. 6 correspond, respectively, to the data of the pixel (1) to the data of the pixel (20). A hatched pixel in FIG. 6 corresponds to "ejection," and a non-hatched pixel corresponds to "non-ejection."

For example, the print data of one line represents a plurality of pixels in a print area of the head (1) to the head (4). In FIG. 6, an area indicated by an arrow represents a range of data of pixels, of the plurality of pixels, which corresponds to each of the SoC (1) to the SoC (4), namely, to each of the head (1) to the head (4). The main controlling circuit 7*a* transmits the print data of one line to the SoC group 410, namely, to the SoC (1).

The SoC (1) stores the data of the pixel (1) to the data of the pixel (8) corresponding to the self to the storing part 41*b* of the self and transmits (transfers) to the SoC (2), the print data from which the data of the pixel (1) to the data of the pixel (5) are excluded. Note that each of the data of the pixel (6) to the data of the pixel (8) represents at least one pixel to be printed on an overlap area 42*b* between the head (1) and the head (2), and is data of at least one pixel corresponding to both of the SoC (1) and the SoC (2). The mask processing part 41*e* of the SoC (1) obtains the data of the pixel (6) to the data of the pixel (8) from the storing part 41*b* of the SoC (1) and applies, for example, the first mask to the data of the pixel (6) to the data of the pixel (8) and stores the data of the pixel (6) to the data of the pixel (8) having the first mask applied thereto in the storing part 41*b* of the SoC (1).

The SoC (2) obtains the print data of the one line from the SoC (1), stores the data of the pixel (6) to the data of the pixel (13) corresponding to the self to the storing part 41*b* of the self, and transmits (transfers), to the SoC (3), the print data from which the data of the pixel (6) to the data of the pixel (10) are excluded. Note that each of the data of the pixel (11) to the data of the pixel (13) represent at least one pixel to be printed on an overlap area 42*b* between the head (2) and the head (3), and is data of at least one pixel corresponding to both of the SoC (2) and the SoC (3).

The mask processing part 41*e* of the SoC (2) obtains the data of the pixel (6) to the data of the pixel (8) from the storing part 41*b* of the SoC (2), applies, for example, the second mask to the data of the pixel (6) to the data of the pixel (8), and stores the data of the pixel (6) to the data of the pixel (8) having the second mask applied thereto in the storing part 41*b* of the SoC (2).

The mask processing part 41*e* of the SoC (2) obtains the data of the pixel (11) to the data of the pixel (13) from the storing part 41*b* of the SoC (2), applies, for example, the first mask to the data of the pixel (11) to the data of the pixel (13), and stores the data of the pixel (11) to the data of the pixel (13) having the first mask applied thereto in the storing part 41*b* of the SoC (2).

The SoC (3) obtains the print data of one line from the SoC (2), stores the data of the pixel (11) to the data of the pixel (18) corresponding to the self to the storing part 41*b* of the self, and transmits (transfers), to the SoC (4), the print data from which the data of the pixel (11) to the data of the pixel (15) are excluded. Note that each of the data of the pixel (16) to the data of the pixel (18) represent at least one pixel to be printed on an overlap area 42*b* between the head (3) and the head (4), and is data of at least one pixel corresponding to both of the SoC (3) and the SoC (4).

The mask processing part 41*e* of the SoC (3) obtains the data of the pixel (11) to the data of the pixel (13) from the storing part 41*b* of the SoC (3), applies, for example, the second mask to the data of the pixel (11) to the data of the pixel (13), and stores the data of the pixel (11) to the data of the pixel (13) having the second mask applied thereto in the storing part 41*b* of the SoC (3).

The mask processing part 41*e* of the SoC (3) obtains the data of the pixel (16) to the data of the pixel (18) from the storing part 41*b* of the SoC (3), applies, for example, the first mask to the data of the pixel (16) to the data of the pixel (18), and stores the data of the pixel (16) to the data of the pixel (18) having the first mask applied thereto in the storing part 41*b* of the SoC (3).

The SoC (4) obtains the print data of one line from the SoC (3) and stores the data of the pixel (16) to the data of the pixel (20) corresponding to the self to the storing part 41*b* of the self. The mask processing part 41*e* of the SoC (4) obtains the data of the pixel (16) to the data of the pixel (18) from the storing part 41*b* of the SoC (4), applies, for example, the second mask to the data of the pixel (16) to the data of the pixel (18) and stores the data of the pixel (16) to the data of the pixel (18) having the second mask applied thereto in the storing part 41*b* of the SoC (4).

The SoC (1) drives the head (1) based on the data of the pixel (1) to the data of the pixel (5), and the data of the pixel (6) to the data of the pixel (8) having the first mask applied thereto. The SoC (2) drives the head (1) based on the data of the pixel (6) to the data of the pixel (5), and the data of the pixel (6) to the data of the pixel (8) having the first mask applied thereto.

The SoC (2) drives the head (2) based on the data of the pixel (6) to the data of the pixel (8) having the second mask applied thereto, the data of the pixel (9), and the data of the pixel (10), and the data of the pixel (11) to the data of the pixel (13) having the first mask applied thereto.

The SoC (3) drives the head (3) based on the data of the pixel (11) to the data of the pixel (13) having the second mask applied thereto, the data of the pixel (14), and the data of the pixel (15), and the data of the pixel (16) to the data of the pixel (18) having the first mask applied thereto.

The SoC (4) drives the head (4) based on the data of the pixel (16) to the data of the pixel (18) having the second mask applied thereto, and the data of the pixel (19) and the data of the pixel (20).

A method of transmitting the print data from the main controlling circuit 7*a* to the SoC group 410 and a method of transmitting the print data among the SoCs will be described (see FIG. 7).

In a case where the main controlling circuit 7*a* obtains the print data of one line from the external apparatus 9, the main controlling circuit 7*a* generates multiple data of pixel groups based on the print data of one line. For example, the main controlling circuit 7*a* divides the data of the pixel (1) into the data of the pixel (20) composing the print data of one line into data of a first pixel group to data of a fourth pixel group. In the following, the data of the first pixel group is also referred to as Pg (1), the data of the second pixel group is also referred to as Pg (2), the data of the third pixel group is also referred to as Pg (3), and the data of the fourth pixel group is also referred to as Pg (4). Note that the number (quantity) of the multiple data of pixel groups is not limited to 4 (four) and may be 3 (three) or less, or 5 (five) or more.

Figure 7:
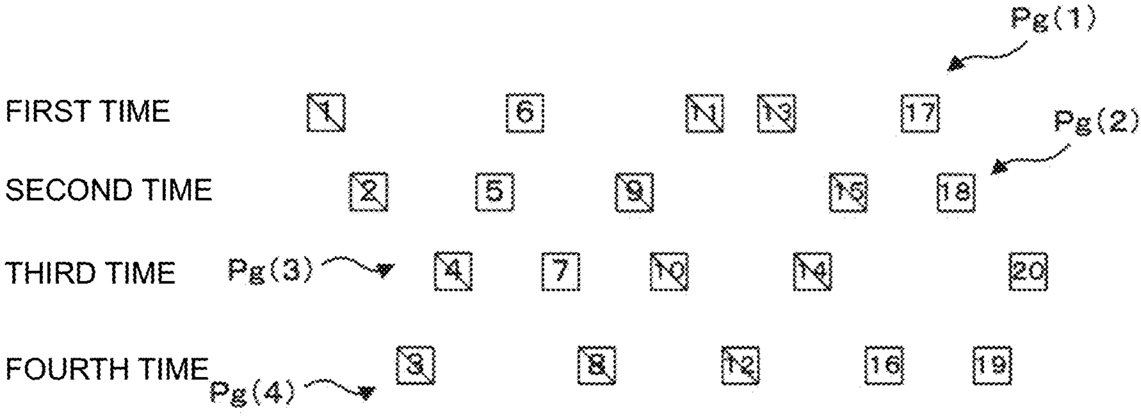
FIG. 7 is a view describing a method of transmitting the print data of one line.

As depicted in FIG. 7, for example, the Pg (1) includes the data of the pixel (1), the data of the pixel (6), the data of the pixel (11), the data of the pixel (13), and the data of the pixel (17). The Pg (2) includes the data of the pixel (2), the data of the pixel (5), the data of the pixel (9), the data of the pixel (15) and the data of the pixel (18). The Pg (3) includes the data of the pixel (4), the data of the pixel (7), the data of the pixel (10), the data of the pixel (14) and the data of the pixel (20). The Pg (4) includes the data of the pixel (3), the data of the pixel (8), the data of the pixel (12), the data of the pixel (16) and the data of the pixel (19). Namely, the main controlling circuit 7*a* generates the Pg (1) to the Pg (4) so as to prevent regularity or bias from occurring in the arrangement of pixels included in the data of each of the Pgs (1) to (4).

The main controlling circuit 7*a* transmits the Pg (1) to the Pg (4) sequentially to the SoC group 410. Namely, the main controlling circuit 7*a* transmits the Pg (1) first, transmits the Pg (2) second, transmits the Pg (3) third, and transmits the Pg (4) fourth.

The storing part 41*b* includes, for example, an SDRAM. The SDRAM includes, for example, a plurality of continuous memory addresses. The plurality of memory addresses is, for example, address (1) to address (4). The number of each of the addresses represents a transmission order of the data. In a case where the SoC (1) obtains the Pg (1) from the main controlling circuit 7*a*, the SoC (1) stores the Pg (1) in the storage area of the address (1) in the storing part 41*b*; in a case where the SoC (1) obtains the Pg (2) from the main controlling circuit 7*a*, the SoC (1) stores the Pg (2) in the storage area of the address (2) in the storing part 41*b*; in a case where the SoC (1) obtains the Pg (3) from the main controlling circuit 7*a*, the SoC (1) stores the Pg (3) in the storage area of the address (3) in the storing part 41*b*; and in a case where the SoC (1) obtains the Pg (4) from the main controlling circuit 7*a*, the SoC (1) stores the Pg (4) in the storage area of the address (4) in the storing part 41*b*.

The SoC (1) cuts, from the storing part 41*b*, the Pg (1) from which the data of the pixel (1) and the data of the pixel (6) corresponding to the self are excluded, and the SoC (1) transmits the Pg (1) from which the data of the pixel (1) and the data of the pixel (6) are excluded to the SoC (2). Next, the SoC (1) cuts, from the storing part 41*b*, the Pg (2) from which the data of the pixel (2) and the data of the pixel (5) corresponding to the self are excluded, and the SoC (1) transmits the Pg (2) from which the data of the pixel (2) and the data of the pixel (5) are excluded to the SoC (2). Next, the SoC (1) cuts, from the storing part 41*b*, the Pg (3) from which the data of the pixel (4) and the data of the pixel (7) corresponds to the self are excluded, and the SoC (1) transmits the Pg (3) from which the data of the pixel (4) and the data of the pixel (7) are excluded to the SoC (2). Next, the SoC (1) cuts, from the storing part 41*b*, the Pg (4) from which the data of the pixel (3) and the data of the pixel (8) corresponds to the self are excluded, and the SoC (1) transmits the Pg (4) from which the data of the pixel (3) and the data of the pixel (8) are excluded to the SoC (2).

Similarly to the SoC (1), each of the Soc (2) and the SoC (3) also stores the Pg (1) to the Pg (4), respectively, in the storage areas of the address (1) to the address (4) in the storing part 41*b* of the self, and cuts, from the storing part 41*b*, each of the Pg (1) to the Pg (4) from which multiple data of pixels corresponding to the self are excluded, and each of the Soc (2) and the SoC (3) transmits the Pg (1) to the Pg (4) from each of which the multiple data of the pixels corresponding to the self are excluded to the SoC disposed downstream thereof. The SoC (4) stores, in the storage area of the storing part 41*b*, the Pg (1) to the Pg (4), namely, the multiple data of the pixels corresponding to the self DMA (Direct Memory Access) transfer can be performed efficiently by storing the Pg (1) to the Pg (4), respectively, in the storage areas of the address (1) to the address (4).

A parity bit is included in each of the Pg (1) to the Pg (4). Every time each of the SoCs (1) to (4) receives the Pg (1) to the Pg (4), each of the SoCs (1) to (4) checks the parity bit of each of the Pg (1) to the Pg (4) and determines whether an error has occurred in the multiple data of the pixels composing each of the Pg (1) to the Pg (4) during the transmission of each of the Pg (1) to the Pg (4).

In a case where the parity bit of any one of the Pg (1) to the Pg (4) indicates an error, each of the SoCs (1) to (4) executes a correcting process with respect to any one of the Pg (1) to the Pg (4) of which parity bit indicates the error. The correcting process includes a first correcting process. In the first correcting process, in a case where data of a pixel in which the error has occurred is a pixel to be printed on an overlap area 42*b* between a certain SoC, and another SOC disposed upstream of the certain SoC among the SoCs (1) to (4), the certain SoC notifies the another SoC disposed upstream thereof of information indicating the data of the pixel in which the error has occurred.

For example, in a case where an error occurs in the Pg (3) during the transmission from the SoC (1) to the SoC (2), the SoC (2) executes the first correcting process with respect to the data of the pixel (7) included in the Pg (3). The data of the pixel (7) is data of at least one pixel with which the printing of the overlap area 42*b* between the Soc (1) and the SoC (2) is performed. The SoC (2) notifies the SoC (1) of information indicating the data of the pixel (7) as the data of the pixel in which the error has occurred. The SoC (1) uses the data of the pixel (7) so as to drive the head (1) without applying the first mask and the second mask to the data of the pixel (7) stored in the storing part 41*b* of the self.

The correcting process includes a second correcting process. In a case where the data of the pixel in which the error has occurred is not data of at least one pixel with which the printing of an overlap area 42*b* between a certain SoC and another SoC disposed upstream of the certain SoC is performed, the certain SoC drives the head based on data of pixel immediately next to the data of the pixel in which the error has occurred, instead of the data of the pixel in which the error has occurred. For example, in a case where an error occurs in the Pg (2) during the transmission from the SoC (1) to the SoC (2), the SoC (2) executes the second correcting process with respect to the data of the pixel (9) included in the Pg (2). The data of the pixel (9) is data of a pixel corresponding only to the SoC (2) and is not the data of at least one pixel with which the printing of the overlap area 42*b* between the SoC (1) and the SoC (2) is performed. The SoC (2) uses data of a pixel which is disposed immediately left to the data of the pixel (9), namely, the data of the pixel (8) so as to drive the head (2), instead of using the data of the pixel (9). Note that data of the pixel, which is positioned immediately right to the data of the pixel (9), namely, the data of the pixel (10), may be used instead of the data of the pixel (9).

The correcting process includes a third correcting process. In the third correcting process, a certain SoC does not transmit data of a pixel in which an error has occurred to another SoC disposed downstream of the certain SoC. In a case where the data of pixel in which the error has occurred is data of a pixel corresponding to the another SoC itself on the downstream side, the another SoC executes the first correcting process or the second correcting process with respect to the data of the pixel in which the error has occurred.

For example, in a case where an error occurs in the Pg (4) during the transmission from the SoC (1) to the SoC (2), the SoC (2) does not transmit the data of the pixel (12), the data of the pixel (16) and the data of the pixel (19) to the SoC (3).

The SoC (3) notifies the SoC (2) of information indicating the data of the pixel (12) as the data of the pixel in which the error has occurred. The SoC (2) drives the head (2) based on the data of the pixel (12), without applying the first mask and the second mask to the data of the pixel (12) stored in the storing part 41*b* of the self, namely executes the first correcting process. Note that as described in the foregoing, in the case where the error occurs in the data of the pixel (12) while the data of the pixel (12) is being transmitted, the SoC (2) executes the second correcting process with respect to the data of the pixel (12). Namely, the SoC (2) uses the data of the pixel (11) instead of using the data of the pixel (12). Since the data of the pixel (11) represents the "ejection", the data of the pixel (12) stored in the SoC (2) also represents the "ejection".

For example, in a case where an error occurs in the Pg (2) during the transmission from the SoC (1) to the SoC (2), the SoC (2) does not transmit the data of the pixel (15) and the data of the pixel (18) to the SoC (3). The SoC (3) drives the head (3) based on the data of the pixel (14) instead of the data of the pixel (15) and drives the head (3) based on the data of the pixel (17), instead of the data of the pixel (18), namely, the SoC (3) executes the second correcting process.

As described above, the main controlling circuit 7*a* generates the Pg (1) to the Pg (4) so that the regularity or the bias does not occur in the arrangement of the pixels included in the data of each of the pixel groups. By doing so, even in a case where an error occurs during the transmission of the data of pixels (the data of a pixel group), each of the SoCs is capable of executing the correcting process to thereby handle the error without requiring the main controlling circuit 7*a* to re-transmit the data of pixels (the data of the pixel group) in which the error has occurred. Namely, each of the SoCs is capable of printing while controlling the degradation of the printing precision and of controlling the degradation of the printing efficiency.

In a case where the regularity or bias occurs in the arrangement of the pixels included in the data of each of the pixel groups during the generation of the Pg (1) to the Pg (4), the error cannot be easily handled by the correcting process. FIG. 8 is a view describing cases in which the regularity or bias occurs in the arrangement of the pixels included in the data of each of the pixel groups during the generation of the Pg (1) to the Pg (4). FIG. 8 represents Cases 1 to 3.

In Case 1, the Pg (1) includes the data of the pixel (1) to the data of the pixel (5), the Pg (2) includes the data of the pixel (6) to the data of the pixel (10), the Pg (3) includes the data of the pixel (11) to the data of the pixel (15), and the Pg (4) includes the data of the pixel (16) to the data of the pixel (20). Namely, each of the Pg (1) to the Pg (4) includes data of a plurality of continuous pixels, namely, data of a plurality of adjacent pixels. In Case 1, an error occurs during the transmission of the Pg (2). Accordingly, instead of using the data of the pixel (6), the SoC (1) uses, for example, the data of the pixel (5) immediately left to the data of the pixel (6), namely, executes the second correcting process. The data of the pixel (6) represents the "non-ejection".

Since the SoC (1) uses the data of the pixel immediately left to the data of the pixel (7) and the data of the pixel (8), instead of using the pixel (7) and the data of the pixel (8), and the data of the pixel (7) and the data of the pixel (8) both represent also the "non-ejection". Since the SoC (2) uses the data of the pixel immediately left to the data of the pixel (9) and the data of the pixel (10), instead of using the pixel (9) and the data of the pixel (10), and the data of the pixel (9) and the data of the pixel (10) both represent also the "non-ejection". Namely, while each of the data of the pixel (8) to the data of the pixel (10) should represent the "ejection" (see FIG. 6), each of the data of the pixel (8) to the data of the pixel (10) represents the "non-ejection". Accordingly, in a case where the pixels included in the data of each of the pixel groups are continuous or adjacent, there is such a fear that the degradation of the quality of the image might not be prevented effectively, even executing the correcting process.

In Case 2, the Pg (1) includes the data of the pixel (1), the data of the pixel (5), the data of the pixel (9), the data of the pixel (15) and the data of the pixel (20). The Pg (2) includes the data of the pixel (2), the data of the pixel (4), the data of the pixel (6), the data of the pixel (11) and the data of the pixel (18). The Pg (3) includes the data of the pixel (3), the data of the pixel (7), the data of the pixel (13), the data of the pixel (17) and the data of the pixel (19). The Pg (4) includes the data of the pixel (8), the data of the pixel (10), the data of the pixel (12), the data of the pixel (14) and the data of the pixel (16). The data of the pixel (2), the data of the pixel (4), and the data of the pixel (6) in the Pg (2) are arranged while being biased to the left side. The data of the pixel (17) and the data of the pixel (19) in the Pg (3) are arranged while being biased to the right side. All the data of the pixels in the Pg (4) are arranged while being biased to the right side. In Case 2, an error occurs during the transmission of the Pg (4).

Since the SoC (1) uses the data of the pixels immediately left to the data of the pixel (8), instead of using the data of the pixel (8), the data of the pixel (8) represents the "non-ejection". The SoC (4) notifies the SoC (3) of information indicating the data of the pixel (16) as the data of pixel in which the error has occurred. The SoC (3) drives the head (3) based on the data of the pixel (16) stored in the storing part 41*b* of the self, without applying the first mask and the second mask to the data of the pixel (16), namely, the Soc (3) executes the first correcting process. Note in a case where the error occurs in the data of the pixel (16) during the transmission of the data of the pixel (16), the SoC (3) executes the second correcting process with respect to the data of the pixel (16). Namely, the SoC (3) uses the data of the pixel (15), instead of using the data of the pixel (16). Since the data of the pixel (15) represents the "ejection", the data of the pixel (16) stored in the storing part 41*b* of the SoC (3) also represents the "ejection". While the data of the pixel (8) should represent the "ejection" (see FIG. 6), the data of the pixel (8) represents the "non-ejection," and while the data of the pixel (16) should represent the "non-ejection" (see FIG. 6), the data of the pixel (16) represents the "ejection." Accordingly, in a case where the positions of the pixels included in the data of each of the pixel groups are biased, there is such a fear that the degradation of the quality of image might not be prevented effectively even executing the correcting process.

In Case 3, the Pg (1) includes the data of the pixel (1), the data of the pixel (5), the data of the pixel (9), the data of the pixel (13) and the data of the pixel (17). The Pg (2) includes the data of the pixel (2), the data of the pixel (6), the data of the pixel (10), the data of the pixel (14) and the data of the pixel (18). The Pg (3) includes the data of the pixel (3), the data of the pixel (7), the data of the pixel (11), the data of the pixel (15) and the data of the pixel (19). The Pg (4) includes the data of the pixel (4), the data of the pixel (8), the data of the pixel (12), the data of the pixel (16) and the data of the pixel (20). In each of the Pg (1) to the Pg (4), the pixels included in the data of the pixel group are arranged regularly at a spacing distance corresponding to three pieces of data of pixel. In Case 3, an error occurs during the transmission of each of the Pg (1) and the Pg (2).

The SoC (1) uses, for example, the data of the pixel (4) positioned immediately left to the data of the pixel (5), instead of using the data of the pixel (5). Namely, the Soc (1) executes the second correcting process. Similarly, the SoC (1) uses the data of the pixel (8), the data of the pixel (12), and the data of the pixel (16), instead of using the data of the pixel (9), the data of the pixel (13) and the data of the pixel (17). Note that there is no data of a pixel immediately left to the data of the pixel (1). Accordingly, instead of using the data of the pixel (1), the SoC (1) uses, for example, the data of the pixel (3) which is the closest to the data of the pixel (1).

The SoC (1) uses, for example, the data of the pixel (1) immediately left to the data of the pixel (2) instead of using the data of the pixel (2); namely, the SoC (1) executes the second correcting process. Similarly, the SoC (1) uses the data of the pixel (5), the data of the pixel (9), the data of the pixel (13), and the data of the pixel (17), instead of using the data of the pixel (6), the data of the pixel (10), the data of the pixel (14) and the data of the pixel (18).

Although the data of the pixel (5) should indicate the "non-ejection" (see FIG. 6), the data of the pixel (5) indicates the "ejection," and the data of the pixel (6) should indicate the "non-ejection" (see FIG. 6), the data of the pixel (6) indicates the "ejection." Accordingly, in a case where the pixels included in the data of each of the pixel groups are arranged regularly, there is a fear that the degradation of the quality of the image might not be controlled effectively even when the correcting process is being executed.

Accordingly, the Pg (1) to the Pg (4) are preferably generated so that any regularity or any bias does not occur in the arrangement of the pixels included in the data of each of the pixel groups. For example, in each of the Pgs, two pieces of data of pixel are arranged at a spacing distance corresponding to two or more pieces of data of pixel, and the pixels included in the data of each of the pixel groups are arranged so as not to be biased to the left side, the right side or the center, and that any regularity does not occur in the arrangement of the pixels included in the data of each of the pixel group.

For example, data of a pixel group (Pg) is transmitted from the SoC (k) to an SoC (k+s) disposed downstream of the SoC (k) with a predetermined number "s" of SoC interposed between the SoC (k) and the SoC (k+s). The Pg includes data of pixels to be printed in the SoC (k+s). Namely, the Pg is data of a pixel group associated with the SoC (k+s). In a case where an error occurs in the Pg during the transmission from SoC (k) to the SoC (k+s), the main controlling circuit 7*a* or the SoC (k) may retransmit the Pg to the SoC (k+s). Since the number of transmissions (transfers) of the data is more likely to be increased and an amount of the error occurring in the data is more likely to be increased as approaching closer to the downstream-most location, there is such a fear that the degradation of the quality of image might not be prevented effectively even executing the correcting process. Accordingly, the main controlling circuit 7*a* or the SoC (k) retransmits the Pg to the SoC (k+s), thereby preventing the degradation of the image quality.

While the invention has been described in conjunction with various example structures outlined above and illustrated in the figures, various alternatives, modifications, variations, improvements, and/or substantial equivalents, whether known or that may be presently unforeseen, may become apparent to those having at least ordinary skill in the art. Accordingly, the example embodiments of the disclosure, as set forth above, are intended to be illustrative of the invention, and not limiting the invention. Various changes may be made without departing from the spirit and scope of the disclosure. Therefore, the disclosure is intended to embrace all known or later developed alternatives, modifications, variations, improvements, and/or substantial equivalents. Some specific examples of potential alternatives, modifications, or variations in the described invention are provided below:

Note that the computer program can be developed to be executed on a single computer, or on a plurality of computers which are located in one site or distributed over a plurality of sites, and which are interconnected by a communication network.

The embodiments disclosed herein are examples in all senses and should be interpreted, not restrictive or limiting in any way. The scope of the present disclosure is intended to encompass all the changes within the scope of the claims and a scope equivalent to the scope of the claims. The technical features described in the embodiments can be combined. Further, the independent claims and the dependent claims described in the claims can be combined with each other in all and any combinations, irrespective of the form of reference therebetween.

What is claimed is:

1. A printing apparatus comprising:

a main controlling circuit;

a sub-controlling circuit group including a plurality of sub-controlling circuits which are connected in series and which are configured to transfer print data transmitted thereto by the main controlling circuit from upstream to downstream of the plurality of sub-controlling circuits; and a plurality of heads, wherein each of the plurality of heads is configured to be driven by one of the plurality of sub-controlling circuits corresponding thereto, the print data includes data of a plurality of pixels, the main controlling circuit is configured to execute:

generation of data of a first pixel group to data of an n-th pixel group regarding the first pixel group to the n-th pixel group each including pixels, of the plurality of pixels, which are not adjacent (the "n" representing a natural number which is 2 or more), based on the print data; and transmission of the data of the first pixel group to the data of the n-th pixel group to the sub-controlling circuit group, and each of the plurality of sub-controlling circuits includes a g-th sub-controlling circuit and a h-th sub-controlling circuit downstream of the g-th sub-controlling circuit and is configured to execute:

obtainment of data of pixels which are associated with each of the plurality of sub-controlling circuits, from the data of the first pixel group to the data of the n-th pixel group, and driving of one of the plurality of heads corresponding thereto, based on the data of the pixels associated with each of the plurality of sub-controlling circuits, wherein the data of the first pixel group to the data of the n-th pixel group include data of a h-th pixel group associated with the h-th sub-controlling circuit, and in a case where an abnormality occurs in the data of the h-th pixel group transmitted from the g-th sub-controlling circuit to the h-th sub-controlling circuit, the g-th sub-controlling circuit is configured to execute re-transmission of the data of the h-th pixel group to the h-th sub-controlling circuit.

2. The printing apparatus according to claim 1, wherein each of the plurality of sub-controlling circuits includes a storing part including a plurality of continuous memory addresses, and each of the plurality of sub-controlling circuits is configured to cause the storing part to store the data of the first pixel group to the data of the n-th pixel group in an order of transmission of the data of the first pixel group to the data of the n-th pixel group, while associating each of the data of the first pixel group to the data of the n-th pixel group with one of the plurality of memory addresses.

3. The printing apparatus according to claim 1, wherein the main controlling circuit is configured to execute the generation of the data of the first pixel group to the data of the n-th pixel group so as to control regularity or bias from occurring in arrangement of the pixels included in each of the first pixel group to the n-th pixel group.

4. The printing apparatus according to claim 1, wherein the plurality of sub-controlling circuits includes a k-th sub-controlling circuit, and a k+1-th sub-controlling circuit (the "k" representing a natural number) which is positioned downstream of the k-th sub-controlling circuit, the plurality of heads includes a k-th head driven by the k-th sub-controlling circuit, and a k+1-th head driven by the k+1-th sub-controlling circuit, the data of the first pixel group to the data of the n-th pixel group include data of a p-th pixel group and data of a q-th pixel group (each of the "p" and the "q" representing a natural number), the data of the p-th pixel group is associated with the k-th sub-controlling circuit, and includes data of at least one pixel, of the plurality of pixels, for printing in an overlap area where area to be printed by the k-th head and an area to be printed by the k+1-th head overlap, the data of the q-th pixel group is associated with the k+1-th sub-controlling circuit, and includes the data of the at least one pixel for printing in the overlap area, and in a case where an abnormality occurs in the data of the q-th pixel group transmitted from the k-th sub-controlling circuit to the k+1-th sub-controlling circuit, the k-th sub-controlling circuit is configured to execute correction of the data of the at least one pixel, for printing in the overlap area, which is included in the data of the q-th pixel group so as to execute the printing in the overlap area, and the k+1-th sub-controlling circuit is configured not to execute the printing in the overlap area.

5. The printing apparatus according to claim 4, wherein in the case where the abnormality occurs in the data of the q-th pixel group transmitted from the k-th sub-controlling circuit to the k+1-th sub-controlling circuit, the k+1-th sub-controlling circuit is configured to execute notification to the k-th sub-controlling circuit that the abnormality has occurred in the data of the q-th pixel group.

6. The printing apparatus according to claim 4, wherein the data of the first pixel group to the data of the n-th pixel group include data of an r-th pixel group and data of an s-th pixel group each of which is associated with the k+1-th sub-controlling circuit and each of which does not include the data of the at least one pixel for printing in the overlap area (each of the "r" and the "s" representing a natural number);

the data of the r-th pixel group includes data of a first pixel, and the data of the s-th pixel group includes data of a second pixel which is adjacent to the first pixel, and in a case where an abnormality occurs in the data of the r-th pixel group transmitted from the k-th sub-controlling circuit to the k+1-th sub-controlling circuit and that an abnormality does not occur in the data of the s-th pixel group transmitted from the k-th sub-controlling circuit to the k+1-th sub-controlling circuit, the k+1-th sub-controlling circuit is configured to execute generation of data corresponding to the data of the first pixel, based on the data of the second pixel.

7. The printing apparatus according to claim 4, wherein the data of the first pixel group to the data of the n-th pixel group include data of a t-th pixel group associated with an f-th sub-controlling circuit downstream of the k+1-th sub-controlling circuit (each of the "f" and the "t" representing a natural number), and in a case where an abnormality occurs in the data of the t-th pixel group transmitted from the k-th sub-controlling circuit to the k+1-th sub-controlling circuit, the k+1-th sub-controlling circuit is configured to execute notification to the f-th sub-controlling circuit that the abnormality has occurred in the data of the t-th pixel group.

8. The printing apparatus according to claim 7, wherein the plurality of heads includes an f-th head driven by the f-th sub-controlling circuit, and an f−1-th head driven by an f−1-th sub-controlling circuit upstream of the f-th sub-controlling circuit, the data of the first pixel group to the data of the n-th pixel group include data of a v-th pixel group (the "v" representing a natural number), the data of the v-th pixel group is associated with the f−1-th sub-controlling circuit, and includes data of at least one pixel for printing in a second overlap area where an area to be printed by the f−1-th head and an area to be printed by the f-th head overlap, the data of the t-th pixel group includes the data of the at least one pixel for printing in the second overlap area, and in a case where an abnormality occurs in the data of the t-th pixel group, the f−1-th sub-controlling circuit is configured to execute correction of the data of the at least one pixel, for printing in the second overlap area, which is included in the data of the v-th pixel group and to execute the printing in the second overlap area.

9. The printing apparatus according to claim 7, wherein the plurality of heads includes an f-th head driven by the f-th sub-controlling circuit and an f−1-th head driven by an f−1-th sub-controlling circuit upstream of the f-th sub-controlling circuit, the data of the t-th pixel group does not include data of at least one pixel, of the plurality of pixels for printing in a second overlap area where an area to be printed by the f−1-th head and an area to be printed by the f-th head overlap, the data of the first pixel group to the data of the n-th pixel group include data of a w-th pixel group which is associated with the f-th sub-controlling circuit and which does not include the data of the at least one pixel for printing in the second overlap area (the "w" representing a natural number), the data of the t-th pixel group includes data of a third pixel, and the data of the w-th pixel group includes data of a fourth pixel which is adjacent to the third pixel, and in a case where an abnormality occurs in the data of the t-th pixel group transmitted from the f−1-th sub-controlling circuit to the f-th sub-controlling circuit and where an abnormality does not occur in the data of the w-th pixel group transmitted from the f−1-th sub-controlling circuit to the f-th sub-controlling circuit, the f-th sub-controlling circuit is configured to execute generation of data corresponding to the data of the third pixel, based on the data of the fourth pixel.

10. The printing apparatus according to claim 1, wherein the sub-controlling circuit group includes a j-th sub-controlling circuit downstream of the main controlling circuit, the data of the first pixel group to the data of the n-th pixel group include data of a j-th pixel group associated with the j-th sub-controlling circuit, and in a case where an abnormality occurs in the data of the j-th pixel group transmitted from the main controlling circuit to the j-th sub-controlling circuit, the main controlling circuit is configured to execute re-transmission of the data of the j-th pixel group to the j-th sub-controlling circuit.

11. A printing method executable in a printing apparatus including a main controlling circuit, a sub-controlling circuit group including a plurality of g-th sub-controlling circuit and a h-th sub-controlling circuit downstream of the g-th sub-controlling circuit which are connected in series and which are configured to transfer print data transmitted thereto by the main controlling circuit from the g-th sub-controlling circuit to the h-th sub-controlling circuit, and a plurality of heads each of which is driven by one of the plurality of sub-controlling circuits corresponding thereto, the print data including data of a plurality of pixels, the printing method comprising:

causing the main controlling circuit to execute:

generation of, based on the print data, data of a first pixel group to data of an n-th pixel group regarding, respectively, the first pixel group to the n-th pixel group each including pixels which are not adjacent (the "n" representing a natural number which is 2 or more); and transmission of the data of the first pixel group to the data of the n-th pixel group to the sub-controlling circuit group; and causing each of the plurality of sub-controlling circuits to execute:

obtainment of data of pixels, of the plurality of pixels, which are associated with each of the plurality of sub-controlling circuits, from the data of the first pixel group to the data of the n-th pixel group; and driving of one of the plurality of heads corresponding thereto, based on data of the pixels associated with each of the plurality of sub-controlling circuits, wherein the data of the first pixel group to the data of the n-th pixel group include data of a h-th pixel group associated with the h-th sub-controlling circuit, and in a case where an abnormality occurs in the data of the h-th pixel group transmitted from the g-th sub-controlling circuit to the h-th sub-controlling circuit, the q-th sub-controlling circuit is configured to execute re-transmission of the data of the h-th pixel group to the h-th sub-controlling circuit.

12. A non-transitory computer-readable medium storing a computer program executable in a printing apparatus including a main controlling circuit, a sub-controlling circuit group including a g-th sub-controlling circuit and a h-th sub-controlling circuit downstream of the g-th sub-controlling circuit which are connected in series and which are configured to transfer print data transmitted thereto by the main controlling circuit from the g-th sub-controlling circuit to the h-th sub-controlling circuit, and a plurality of heads each of which is driven by one of the plurality of sub-controlling circuits corresponding thereto; the print data including data of a plurality of pixels, the computer program causing the main controlling circuit to execute:

generation of, based on the print data, data of a first pixel group to data of an n-th pixel group regarding the first pixel group to the n-th pixel group each including pixels, of the plurality of pixels, which are not adjacent (the "n" representing a natural number which is 2 or more), and transmission of the data of the first pixel group to the data of the n-th pixel group to the sub-controlling circuit group; and causing each of the plurality of sub-controlling circuits to execute:

obtainment of data of pixels, of the plurality of pixels, which are associated with each of the plurality of sub-controlling circuits, from the data of the first pixel group to the data of the n-th pixel group; and driving of one of the plurality of heads corresponding thereto, based on the data of the pixels associated with each of the plurality of sub-controlling circuits, wherein the data of the first pixel group to the data of the n-th pixel group include data of a h-th pixel group associated with the h-th sub-controlling circuit, and in a case where an abnormality occurs in the data of the h-th pixel group transmitted from the g-th sub-controlling circuit to the h-th sub-controlling circuit, the g-th sub-controlling circuit is configured to execute re-transmission of the data of the h-th pixel group to the h-th sub-controlling circuit.

* * * * *